US007686146B2

(12) United States Patent
Taylor (10) Patent No.: US 7,686,146 B2
(45) Date of Patent: Mar. 30, 2010

(54) COMBINATION VISCOUS FAN DRIVE AND VISCOUS HEAT DEVICE

(75) Inventor: Dwayne Robert Taylor, Livonia, MI (US)

(73) Assignee: DENSO International America, Inc., Southfield, MI (US)

( * ) Notice: Subject to any disclaimer, the term of this patent is extended or adjusted under 35 U.S.C. 154(b) by 332 days.

(21) Appl. No.: 11/528,168

(22) Filed: Sep. 27, 2006

(65) Prior Publication Data

US 2008/0073174 A1    Mar. 27, 2008

(51) Int. Cl.
*B60H 1/04* (2006.01)
*F02N 17/06* (2006.01)
*F16D 67/06* (2006.01)

(52) U.S. Cl. ............... 192/18 B; 192/12 A; 123/41.49; 123/142.5 R; 237/12.3 B (58) Field of Classification Search ............... 192/17 A, 192/17 C, 17 D, 57, 58.4, 113.31
See application file for complete search history.

(56) References Cited

U.S. PATENT DOCUMENTS

| | | | |
|---|---|---|---|
| 3,993,415 A | 11/1976 | Hauser | |
| 5,755,379 A | 5/1998 | Ito | |
| 5,778,843 A | 7/1998 | Inoue et al. | |
| 5,816,495 A | 10/1998 | Ito | |
| 5,829,675 A | 11/1998 | Ban | |
| 5,836,270 A | 11/1998 | Aoki et al. | |
| 5,852,995 A | 12/1998 | Aoki et al. | |
| 5,884,839 A | 3/1999 | Aoki et al. | |
| 5,896,832 A | 4/1999 | Aoki et al. | |
| 5,897,056 A | 4/1999 | Morikawa et al. | |
| 5,899,183 A | 5/1999 | Aoki et al. | |
| 5,931,380 A | 8/1999 | Aoki et al. | |
| 5,938,115 A | 8/1999 | Aoki et al. | |
| 5,954,120 A | 9/1999 | Aoki et al. | |
| 6,021,747 A * | 2/2000 | Gee et al. ................ | 123/41.12 |
| 6,027,032 A | 2/2000 | Aoki et al. | |
| 6,029,613 A | 2/2000 | Ohshima et al. | |
| 6,244,232 B1 | 6/2001 | Ban et al. | |
| 6,622,843 B2 | 9/2003 | Nakagawa et al. | |
| 2005/0178635 A1* | 8/2005 | Schultheiss et al. .......... | 192/57 |
| 2005/0205374 A1* | 9/2005 | Boffelli et al. ............ | 192/18 B |

* cited by examiner

*Primary Examiner*—Richard M. Lorence
(74) *Attorney, Agent, or Firm*—Harness, Dickey & Pierce, PLC (57) ABSTRACT

A combined viscous heater and viscous coupling fan drive operates on principles of viscous coupling to provide both, supplemental vehicle interior cabin heating, and rotation to a cooling fan mounted to a fan shaft. A viscous drive chamber and case surround a drive plate and a viscously driven plate. A liquid coolant chamber and case surrounds the viscous drive case that houses the plates for viscous coupling. Liquid coolant passes through the liquid coolant chamber as coolant circulates through the engine block. The coolant chamber has a coolant inlet and outlet. An electromagnetic clutch engages to turn a shaft and the driving plate which viscously couples to and turns the driven plate, which is connected to a shaft and engine cooling fan. The electromagnetic clutch and a fan brake are controlled to govern viscous heat generation by the plates and cooling fan operation.

9 Claims, 6 Drawing Sheets

COMBINATION VISCOUS FAN DRIVE AND VISCOUS HEAT DEVICE

FIELD

The present disclosure relates to a viscous fan drive and a viscous heat generating device. More specifically, the disclosure relates to a device that is the combination of a viscous coupling drive for an engine cooling fan and a viscous heating device that may provide supplemental heat to an interior cabin of a vehicle.

BACKGROUND

The statements in this section merely provide background information related to the present disclosure and may not constitute prior art. Certain automotive internal combustion engines, diesel engines in particular, require a high airflow engine-driven cooling fan to provide a heat-removing airflow through the radiator and past the engine during high engine load, high engine temperature, conditions. Such engines may also require a supplemental heat-generating device to provide supplemental heat to the interior cabin of a vehicle. Such a supplemental heat-generating device may be necessary for internal combustion engines during periods of low ambient temperature, such as during sub-freezing temperatures, especially with diesel-powered vehicles, which may not generate a sufficient output of engine heat to satisfactorily heat the interior cabin of a vehicle. A supplemental heat-generating device may also be used to hasten the delivery of heat to a vehicle interior cabin when a vehicle engine is initially started. Without such a supplemental heat-generating device an engine may never develop enough heat to heat a vehicle cabin, or may require extended periods of time to provide such heat. While separate devices of viscous cooling fans and supplemental viscous heaters have generally proven satisfactorily for their individual purposes, each is associated with their share of limitations.

One such limitation associated with each device is the amount of space that each utilizes within a vehicle's engine compartment. A second limitation is that the current devices each require their own separate pulley on the engine accessory drive. A third limitation is that each device must be separately assembled to an engine during engine assembly. This requires valuable time which has an associated cost.

What is needed then is a device that does not suffer from the above limitations. This, in turn, will provide a device that integrates an engine cooling fan drive and a supplemental heat generating device that can reduce engine assembly time and the cost associated with producing two separate parts, and requires only one pulley on the accessory drive for both functions.

SUMMARY

The present invention has been made in view of the above-mentioned problem and need. A viscous fan drive also functions as a viscous heat generating device. The viscous fan drive utilizes a viscous coupling device that has two plates, a driving plate and a driven plate. The plates rotate together yet do not contact each other because a viscous fluid is maintained between them to permit their coupling and the transfer of torque from the driving plate to the driven plate. The driving plate is driven by a shaft energized by a pulley coupled to an electromagnetic clutch.

When the clutch is energized, the driving shaft is driven at the same speed as the pulley, since the pulley and the shaft become coupled through the clutch. The pulley obtains its rotation from another pulley driven by the engine, such as from a pulley coupled to an engine water pump or directly from a pulley attached to the end of the crankshaft. The driving shaft drives or rotates the driving plate which becomes viscously coupled to the driven plate. The driving plate and the driven plate then rotate at the same speed, except for some loss of speed due to slippage across the viscous fluid. The driven plate rotates the driven shaft which is connected to an engine cooling fan. The cooling fan provides airflow through the radiator as needed. The driving and driven plates reside in a viscous coupling chamber.

The viscous coupling chamber is surrounded by a separate viscous heater cavity. When viscous heat is desired, a fan brake prevents rotation of the engine cooling fan, which prevents the driven plate from becoming viscously coupled to the driving plate and from rotating. Heat is then generated within the viscous coupling chamber as the driving plate rotates relative to the driven plate. Heat is generated by the shearing of the viscous fluid between the plates within the viscous chamber. Heat transfers to the viscous heater chamber where the engine's liquid cooling fluid passes through and absorbs heat. The heat laden liquid coolant then flows to the heater core through which air is passed to blow heated air into the vehicle cabin. An output from the vehicle's engine control module may engage and disengage the electromagnetic clutch and the electric or electromagnetic fan brake to control viscous heating and engine fan cooling.

The viscous heat generating function of the combined device may be used as a supplemental heat generating device when the ambient temperature necessitates more vehicle interior cabin heat than an internal combustion engine can provide through its regular liquid cooling system. Such a necessity may arise when a diesel engine is idling outdoors when ambient temperatures are below 32 degrees Fahrenheit (0 degrees Celsius). Another such instance may be when any interior occupant requires heat within the vehicle interior cabin before the internal combustion engine (diesel, gasoline, etc.) can supply such heat through its regular liquid cooling system. That is, the viscous heater may provide heat to the liquid coolant faster than the engine can provide heat to the liquid coolant. Such supplemental heat hastens interior heating via the vehicle's liquid cooling system. When neither supplemental heat nor the cooling fan is necessitated, the electromagnetic clutch is not engaged, and thus neither viscous heat is generated nor is viscous coupling accomplished.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Certain automotive internal combustion engines, such as diesel engines for example, may require a high airflow engine driven cooling fan for engine cooling during high engine load conditions as well as a supplemental heating device for passenger comfort during periods of low ambient temperatures. Generally, when idling, a diesel engine may not generate sufficient amounts of engine heat to supply heat to a liquid coolant circulating through the engine. Without sufficient engine heat, the liquid coolant circulating through the heater core may not be of a high enough temperature to satisfactorily supply heat to an interior cabin of a vehicle. Such is true for both large and small diesel engines. Furthermore, even if a vehicle equipped with a diesel engine is driven immediately after startup, thereby increasing engine revolutions and heat generated by the engine, the liquid coolant circulating through the engine will still require time to absorb a sufficient quantity of heat which may then be transferred through the heater core to ultimately warm the air in the vehicle cabin. The device of the present teachings is not limited to a diesel engine but may be applied to gasoline engines, or engines utilizing other fuels. A diesel engine is used for exemplary purposes only.

A viscous fluid heating device compensates for the otherwise slow and/or inadequate supply of heat to a vehicle interior cabin resulting from the inability of a vehicle engine to supply adequate quantities of heat, such as during idling of a vehicle engine or immediately after initial engine start-up. Alternatively, supplemental heat may be supplied by invoking a viscous heat generating device in addition to a traditional heating system of a vehicle, even when a vehicle is moving, such as during initial vehicle movement just after engine starting. After the engine coolant is sufficiently heated, the viscous heat generator may not be needed and may be disengaged. Additionally, in the summer, when the heating system is not needed, the viscous heating device need not be used; however, the engine cooling fan may be driven by the same viscous device.

Figure 1:
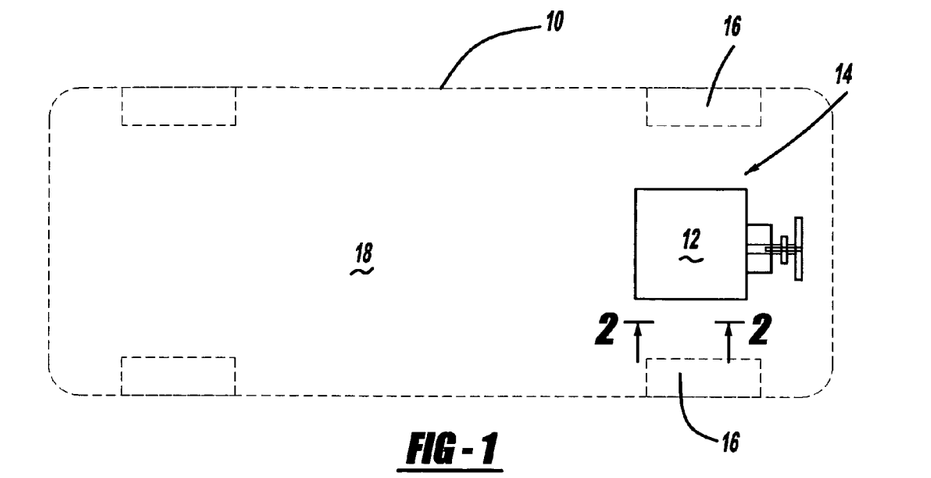
FIG. 1 is a top view of a vehicle depicting the general location of an engine and associated heating and cooling components.
Figure 2A:
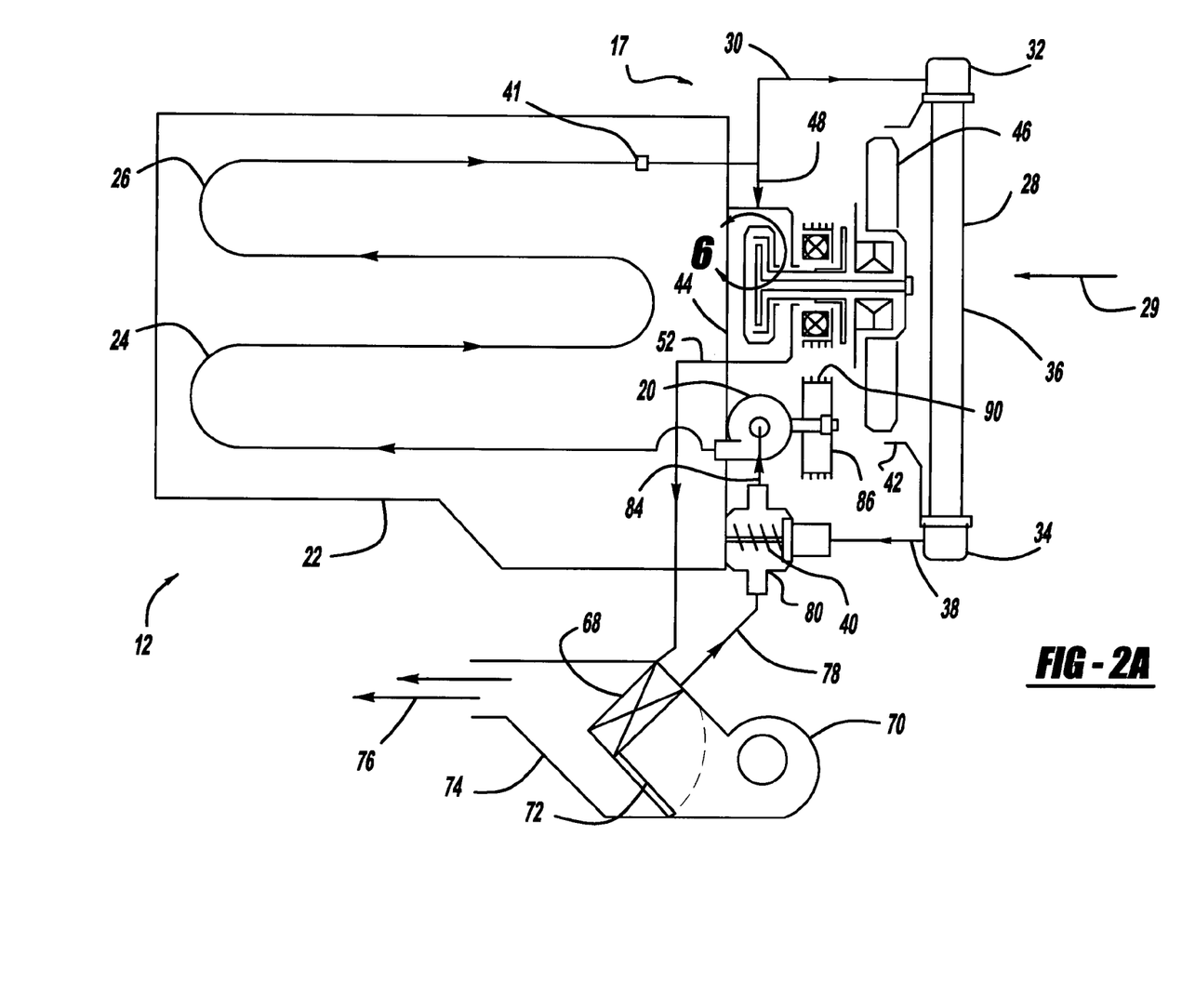
FIG. 2A is a side view of a viscous heater and fan drive that also depicts the liquid flow route of coolant through the cooling system.

The device of the present teachings provides a viscous driving device for an engine driven cooling fan and a supplemental viscous heater device, which will now be explained with initial reference to FIGS. 1-5. FIG. 1 is a top view of a vehicle 10 depicting the general location of an engine 12 and associated heating and cooling components 14. In the arrangement depicted, the engine 12 is primarily located between the front wheels 16. FIG. 2A is a side view of the heating and cooling components 14 depicting the flow route of coolant through a cooling system 17. Expanding upon FIG. 2A, liquid coolant, such as water or a water and anti-freeze mixture, leaves the water pump 20 and flows into the engine block 22. In the engine block 22, the liquid coolant flows through a bottom path 24 and a top path 26. Generally, as the liquid coolant passes through the engine block 22, the liquid coolant absorbs heat generated by internal combustion within the engine 12.

Upon passing out of the engine block 22, the liquid coolant flows into two paths simultaneously. The first path is through the top radiator tube or hose 30 and into the top radiator tank 32 of the radiator 28. Once in the radiator 28, the liquid coolant flows through a designated path and then exits the radiator 28 through the bottom tank 34. While in the radiator 28, the liquid coolant radiates or expels heat to the atmosphere when air flow 29 passes through the radiator core portion 36 of the radiator 28 and is guided into the fan shroud 42 and over the engine 12, thereby cooling the engine 12. A viscously driven fan 46 assists in drawing air through the radiator 28. Upon exiting the bottom radiator tank 34, the liquid coolant flows into the bottom radiator tube or hose 38 before passing into the thermostat 40. An alternate location for the thermostat would be on the inlet side of the radiator. The thermostat 40 is of the ordinary type used in internal combustion engines, which blocks flow from passing through the radiator 28 when coolant temperatures are below a predetermined level.

Figure 3:
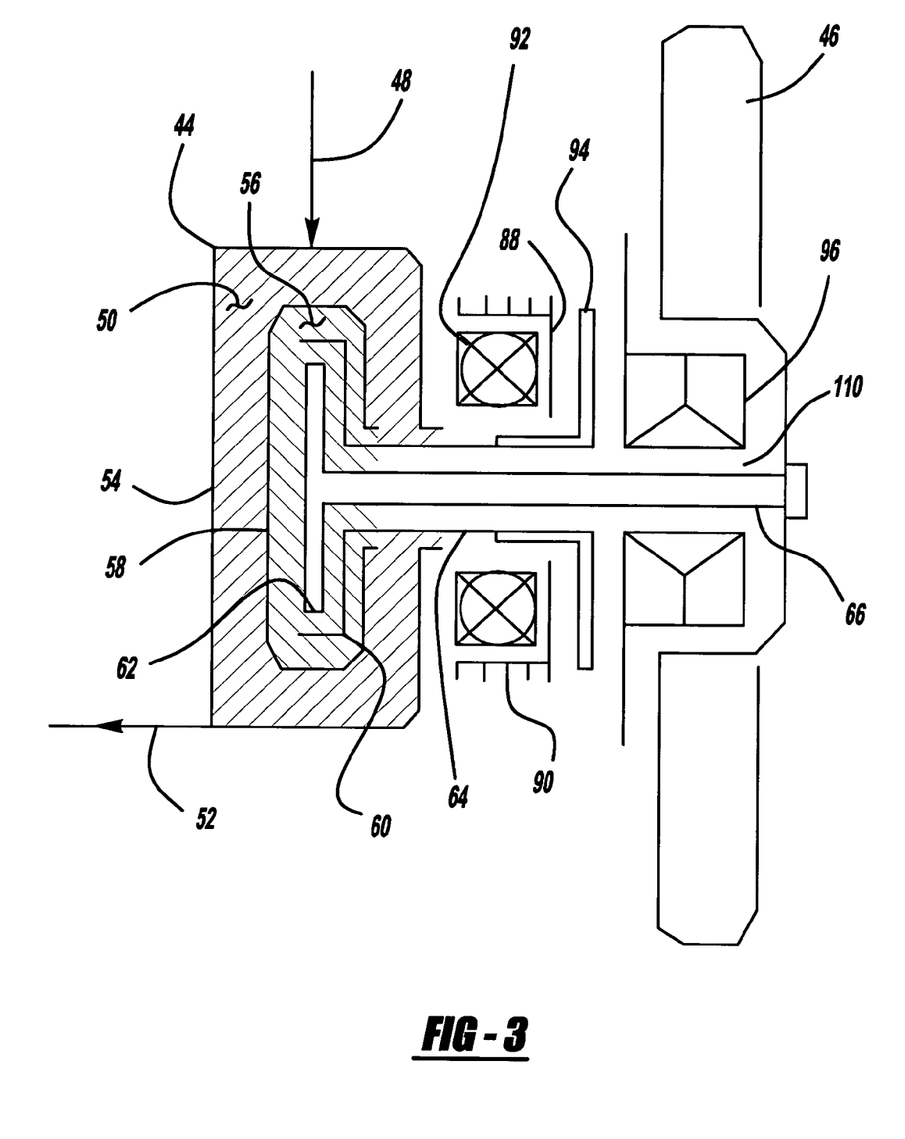
FIG. 3 is an enlarged view of a viscous heater and fan drive depicting an electromagnetic clutch disengaged and a fan brake disengaged.

A second path that the liquid coolant may flow through from the top path 26 is into the supplemental viscous heater and fan drive 44 through the viscous heater and fan drive inlet tube 48, also referred to simply as a coolant inlet 48 or inlet. FIG. 3 is an enlarged view of the viscous heater and fan drive and will be used to further explain the components of the viscous heater and fan drive 44. The viscous heater and fan drive 44 mounts to the engine and receives liquid coolant from the inlet 48 and delivers it to the viscous heater cavity 50. The viscous heater cavity 50 is surrounded by a viscous heater case 54, also called the outer case 54 or coolant case 54. The viscous heater and fan drive 44 has a viscous heater and fan drive outlet 52, also called the coolant outlet 52 or outlet 52 that permits liquid coolant to exit from the viscous heater cavity 50. The viscous heater cavity 50 completely surrounds another enclosed cavity, the viscous fan drive cavity 56 or shear chamber 56. The viscous heater cavity 50 is also referred to as the coolant chamber.

Figure 6:
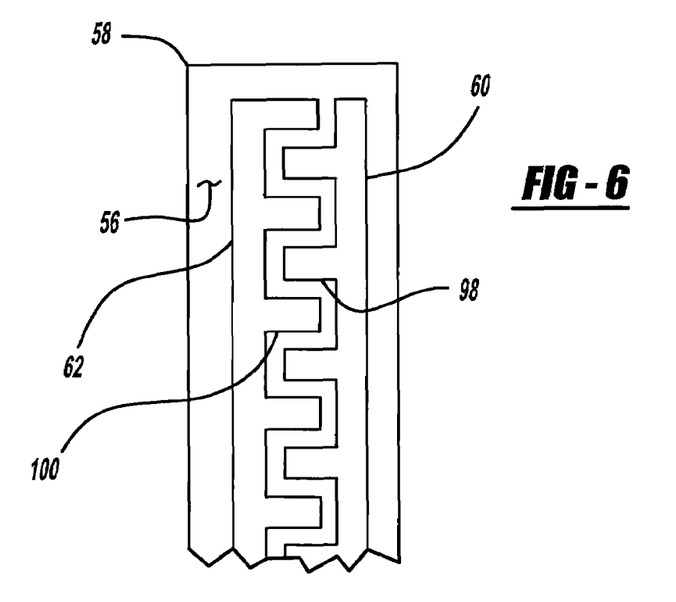
FIG. 6 is an enlarged view of the internal plates of a viscous drive device.

FIG. 6 is an enlarged view of the viscous fan drive cavity 56, or shear chamber 56, which is surrounded by a viscous fan drive case 58, also called the inner case 58. Within the inner case 58, a viscous fluid is used to generate heat when a driving plate 60 rotates relative to a driven plate 62 and shears the fluid. The fluid used between and surrounding the driving plate 60 and the driven plate 62 may be a silicon oil type of viscous fluid. The viscous fluid used in the viscous fan drive cavity 56 is generally of a high viscosity, and generally must maintain its viscosity at elevated or high temperatures, such as during its steady-state use. An example of a silicon oil is one that has a viscosity of 5,000-10,000 cst (centi-stokes) and is heat-resistant up to about 200 degrees Centigrade.

With reference to FIGS. 3 and 6, one can see that the driving plate 60 is connected to a driving plate shaft 64 or drive pulley shaft 64 while the driven plate 62 is connected to a driven plate shaft 66 or fan shaft 66. A fan 46 is connected or mounted to the end of the fan shaft 66, which is coupled to the viscous heater and fan drive 44, also referred to as the viscous drive.

Continuing with the fluid routing and reference to FIGS. 2A and 3, upon exiting the viscous heater and fan drive 44, or more specifically, the viscous heater cavity 50, the liquid coolant proceeds from the outlet 52 and into the heater core 68. While passing through the heater core 68, the liquid coolant expels heat as air is forced through the heater core 68 by a blower 70. The amount of air permitted to pass through the heater core 68 is governed by a door 72. Warmed or heated air 76 passes out of the heater core casing 74 as indicated by arrows 76 and into the vehicle interior cabin 18 (FIG. 1). With continued reference to FIG. 2A, the liquid coolant passes out of the heater core 68 through tube 78 and into a thermostat case 80 that houses and encloses the thermostat 40. From the thermostat case 80, the liquid coolant passes into the water pump 20 through tube 84.

Before a more detailed explanation of the operative workings of the present teachings is presented, each of FIGS. 2A, and 3-5 will be explained. FIG. 2A depicts an overall structural scenario of the viscous heater and fan drive 44 relative to an engine 12 and a general liquid cooling path 24, 26 through the engine 12. FIG. 3 depicts the viscous heater and fan drive 44 with the electromagnetic clutch 92, also simply referred to as a clutch, disengaged and the fan brake 96 disengaged. In such states of disengagement, there is no heat generated by the viscous heater and fan drive 44 and the fan will not spin because the viscous heater and fan drive 44 is not operating due to the disengagement of the electromagnetic clutch 92.

Figure 4:
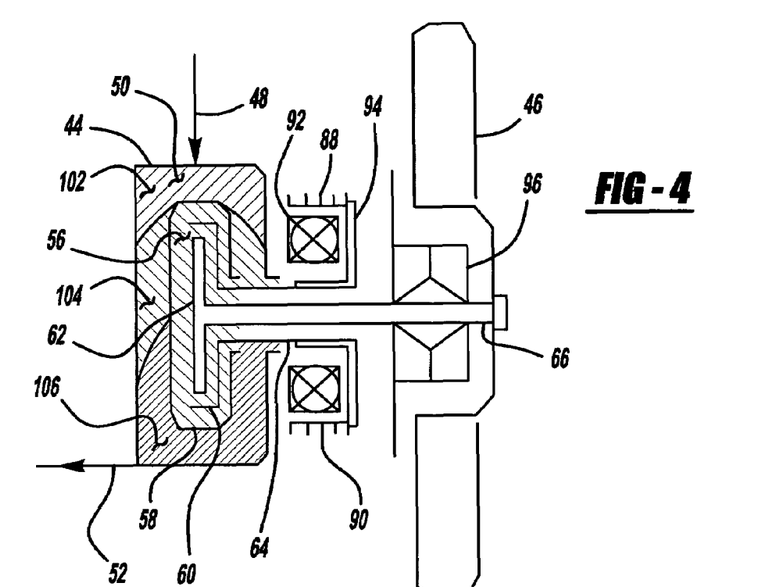
FIG. 4 is an enlarged view of a viscous heater and fan drive depicting an electromagnetic clutch engaged and a fan brake engaged.
Figure 5:
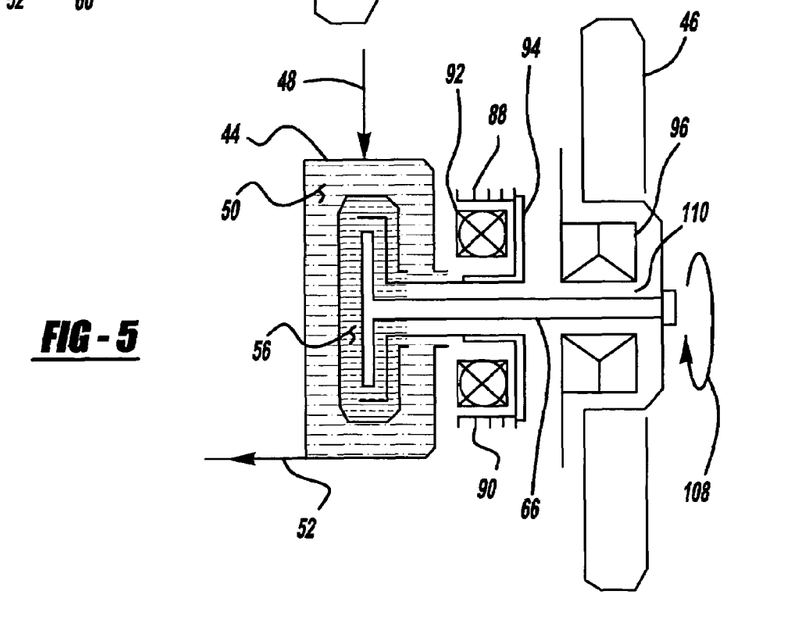
FIG. 5 is an enlarged view of a viscous heater and fan drive depicting an electromagnetic clutch engaged and a fan brake disengaged.

FIG. 4 depicts the viscous heater and fan drive 44 with the electromagnetic clutch 92 engaged and the fan brake 96 engaged. In this state of engagement of the electromagnetic clutch 92, heat is generated in the viscous heater and fan drive 44, but the fan 46 will not spin because of the engagement of the fan brake 96. With the fan brake 96 engaged, no cooling air is pulled through the radiator 28 by the fan 46; only supplemental heat is generated in the viscous fan drive cavity 56. FIG. 5 depicts the viscous heater and fan drive 44 with the electromagnetic clutch 92 engaged and the fan brake 96 disengaged. In this state, the viscous heater and fan drive 44 does not generate heat, but due to viscous coupling, the cooling fan 46 spins to provide cooling air through the radiator 28.

Now, with continued reference to FIGS. 2A and 3, operation of the viscous heater and fan drive 44 will be further explained. When the engine 12 is started by an operator, the engine pulley 86 rotates on a shaft, to which the water pump 20 is attached, protruding from the engine block 22. The engine pulley 86 may or may not be integral with the water pump 20, which also spins. The engine pulley 86 transmits its rotational energy to the electromagnetic clutch pulley 88, also called a drive pulley, by a belt 90, such as a ploy-v belt, as an example. With rotational energy transmitted, the engine pulley 86 and the electromagnetic clutch pulley 88 may turn at the same speed, minus slippage across the viscous fluid. The electromagnetic clutch pulley 88 works in conjunction with an electromagnetic clutch 92 such that when the electromagnetic clutch is engaged, as depicted in FIG. 4, the electromagnetic clutch pulley 88 engages and spins with the driving plate shaft 64, also called the drive pulley shaft 64, which causes the driving plate 60 within the viscous fan drive case 58 to spin. As can be seen in FIG. 4, the electromagnetic clutch 92 causes the clutch plate 94 to become engaged and spin. Because the clutch plate 94 is connected to, or is joined as the same piece with, the driving plate shaft 64, the driving plate shaft 64 spins in concert with the electromagnetic clutch pulley 88.

FIG. 4 depicts an engaged clutch plate 94 which occurs upon energizing the electromagnetic clutch 92 to cause rotation of the driving plate shaft 64 and the driving plate 60. FIG. 6 depicts the interaction of the driving plate 60 with the driven plate 62 within the viscous fan drive case 58. More specifically, the driving plate 60 rotates and shears the viscous fluid, as discussed above, within the viscous fan drive cavity 56. As depicted in FIG. 6, the shearing of the viscous fluid may be hastened by one or more driving plate protrusions 98 and one or more driven plate protrusions 100. Such protrusions increase the surface area in contact with the viscous fluid, which hastens the generation of heat through shear of the viscous fluid. In addition to hastening the generation of heat through shear of the viscous fluid, the protrusions 98, 100, because of their effect of increasing surface area in contact with the viscous fluid, cause the driving (spinning or rotating) effect of the driving plate 60 to be transferred to the driven plate 62. One should note that FIG. 3 depicts the clutch plate 94 disengaged from the electromagnetic clutch pulley 88 and as a result, the driving plate shaft 64 and hence the driving plate 60 do not rotate, and thus no heat is generated within the viscous fan drive case 58. Additionally, the engine cooling fan 46 does not rotate.

FIG. 4 depicts a scenario different from FIG. 3. FIG. 4 is an enlarged view of a supplemental heater fan drive depicting an electromagnetic clutch 92 engaged and a fan brake 96 engaged. More specifically, FIG. 4 depicts the engagement of the clutch plate 94 with the with the clutch pulley 88 upon energizing the electromagnetic clutch 92. This causes the driving plate shaft 64 to rotate which causes the driving plate 60 to rotate and viscously shear the fluid within the viscous fan drive cavity 56 (FIG. 6). Additionally, FIG. 4 depicts a fan brake 96 that is in an actuated state, as opposed to the non-actuated state of the fan brake 96 in FIG. 3. As depicted in FIG. 4, with the fan brake 96 actuated against the shaft 66, the driven plate shaft 66 does not spin. In such a state, with the driving plate 60 (FIG. 4) spinning, the driving plate 60, "braked" driven plate 62, and viscous fluid within the viscous fan drive cavity 56 generate friction, and thus heat within the viscous fluid within the viscous fan drive cavity 56.

Continuing with FIG. 4, as the engine 12 drives the pulley 86, which in turn drives the electromagnetic clutch pulley 88 coupled to the clutch plate 94 which turns with the driving plate shaft 64 which is coupled to the viscous drive 44, heat is generated within the viscous fluid of the viscous fan drive case 58 by the rotation of the plates 60, 62 and viscous fluid. This heat is then transferred to the viscous heater cavity 50 which contains liquid coolant. Heat within the viscous heater cavity 50 is divided into three general zones. Heat zone one 102 is located at the top of the viscous fan drive case 58 where the liquid coolant first enters the viscous heater cavity 50. Because the liquid coolant is cool, relatively speaking, when the engine 12 is first started, heat zone one 102 is the coolest of the other zones. As heat is generated within the viscous fan drive cavity 56 by the driving plate 60, driven plate 62, and viscous fluid, the liquid coolant in the viscous heater cavity 50 absorbs the transferring heat. Heat zone two 104 will generally be warmer than heat zone one 102 because the liquid coolant continues to absorb heat as the coolant passes through the viscous heater cavity 50. Likewise, heat zone three 106 will generally be warmer than heat zone two 104 and heat zone one 102 as the liquid coolant absorbs heat passing further through the viscous heater cavity 50.

Continuing with FIG. 4, the liquid coolant leaving the viscous heater cavity 50 through the viscous heater and fan drive outlet 52 ("outlet") is warmer than the liquid coolant entering at the viscous heater and fan drive inlet 48 ("inlet"). Such temperature difference between the liquid coolant entering the viscous heater cavity 50 and the liquid coolant leaving the viscous heater cavity 50 is the result of the viscous heating. Finally, the scenario depicted in FIG. 4 and described above is also referred to as the "cabin heater boost mode" because it delivers additional heat to the engine's liquid coolant to help "boost" the temperature of the liquid coolant passing through the heater core 68 which transfers heat to the interior cabin via the blower 70 and warmed air depicted by arrows 76.

FIG. 5 is an enlarged view of the viscous heater and fan drive 44 depicting the electromagnetic clutch 92 engaged and the fan brake 96 disengaged, as evidenced by the gap 110 between the fan brake 96 and the shaft 66. In such a state, the viscous heater and fan drive 44 generates only a small amount of waste heat due to slippage across the viscous fluid because the cooling fan 46 is permitted to spin as the driven plate 62 spins at the same rpm, minus said slippage, as the driving plate 60 within the viscous fan drive cavity 56 due to viscous coupling of the plates 60, 62. More specifically, when the electromagnetic clutch 92 is engaged and the clutch plate 94 is thereby engaged with the pulley 88, and thereby begins to spin at the same rpm as the pulley 88, thereby invoking rotation of the driving plate shaft 64, the driven plate 62 also begins to rotate. When the driving plate 60 rotates, the driven plate 62 also rotates due to viscous coupling, thereby causing the fan shaft 66 to rotate. Since the fan brake 96 is disengaged in FIG. 5, and the fan 46 is attached to the fan shaft 66, the fan 46 spins at the same rotational speed as the driving plate 60, minus slippage across the viscous fluid. Because the driving plate 60 and the driven plate 62 both rotate at the same speed there is only a relatively small amount of waste heat generated in the viscous fluid between the driving plate 60 and the driven plate 62, which is transferred to the coolant and expelled by the radiator. That is, when the fan 46 is rotating and supplying engine cooling air through the radiator 28, there is very little heat generated in the viscous fan driving cavity 56.

Figure 2B:
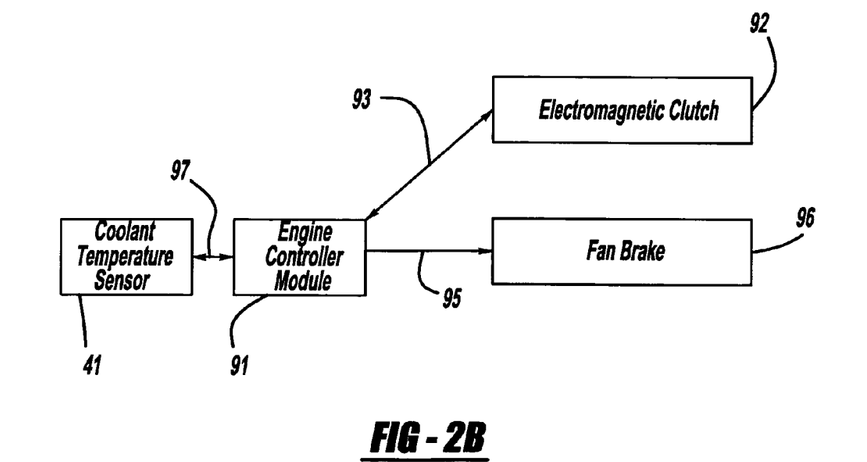
FIG. 2B is a block diagram depicting communication channels between components related to the viscous heater and fan drive.

Supplying supplemental heat via the viscous fan drive cavity 56 and viscous heater cavity 50, and engine cooling air through the radiator 28 via the fan 46, may be performed by a controller 91 (FIG. 2B). To activate the electromagnetic clutch 92 and the fan brake 96, the vehicle's engine control module 91 may communicate with the electromagnetic clutch 92 and the fan brake 96 to engage and disengage the electromagnetic clutch 92 and fan brake 96 based on the coolant temperature measured by a coolant temperature sensor 41 located near the coolant outlet portion of the engine at the top radiator tube or hose 30. More specifically, and with reference to FIG. 2A, when the temperature of the liquid coolant exiting the engine 12 and flowing into tube 30 is lower than a prerequisite temperature, the electromagnetic clutch 92 may be engaged to begin turning the driving plate 60. At the same time, the fan brake 96 may be engaged to lock the fan 46 and prevent the fan 46 from spinning. This causes the driving plate 60 to spin while the driven plate 62 remains stationary with the fan 46. The rotating driving plate 60 and stationary driven plate 62 generates heat in the viscous fan drive cavity 56 in accordance with the description of FIG. 4 above.

With reference to FIG. 2B, communication to accomplish such may be controlled by the vehicle's engine control module 91 or a similar module or controller and communicative wires 93, 95 and 97 that permit communication between the coolant temperature sensor 41, which detects the temperature of the liquid coolant in the engine 12, just before or at the outlet to the top radiator tube or hose 30, the electromagnetic clutch 92, the fan brake 96, and the controller 91. When the temperature of the liquid in the engine 12 near the outlet to tube 30 is above a prerequisite temperature, the controller communicates with the electromagnetic clutch 92 and the fan brake 96 to return them to their disengaged states, in accordance with FIG. 3. This would halt the production of supplemental heat into the heater core 68.

Similarly, the fan 46 may be operated without generating heat within the viscous heater and fan drive 44. For instance, if the temperature of the liquid coolant taken at the engine 12 near the outlet to the top radiator tube or hose 30 is above a threshold temperature, then the electromagnetic clutch 92 may be engaged to begin operation of the driving plate 60 and the driven plate 62. In such a scenario, the fan brake 96 would be disengaged to permit rotation of the fan 46 to provide cooling airflow to the radiator 28 to lower the engine temperature as determined by the liquid coolant temperature at the engine 12 near the outlet to the top radiator tube or hose 30. Such operation would be in accordance with FIG. 5 as fan rotation arrow 108 indicates. Additionally, to invoke such a scenario, the controller 91 would communicate with the temperature sensor 41, the electromagnetic clutch 92, and the fan brake 96.

Finally, in the event that the liquid coolant temperature, as monitored by the thermostat 40, is high enough to not require supplemental interior cabin heating, yet at a temperature to be in normal engine operating range, no engagement of the electromagnetic clutch 92 or the fan brake 96 would occur, and the viscous heater and fan drive 44 and fan 46 would not operate. Such operational state is depicted by FIG. 3. More specifically, there is a gap 110 between the fan brake 96 and shaft 66, and between the pulley 88 and clutch plate 94.

Figure 7A:
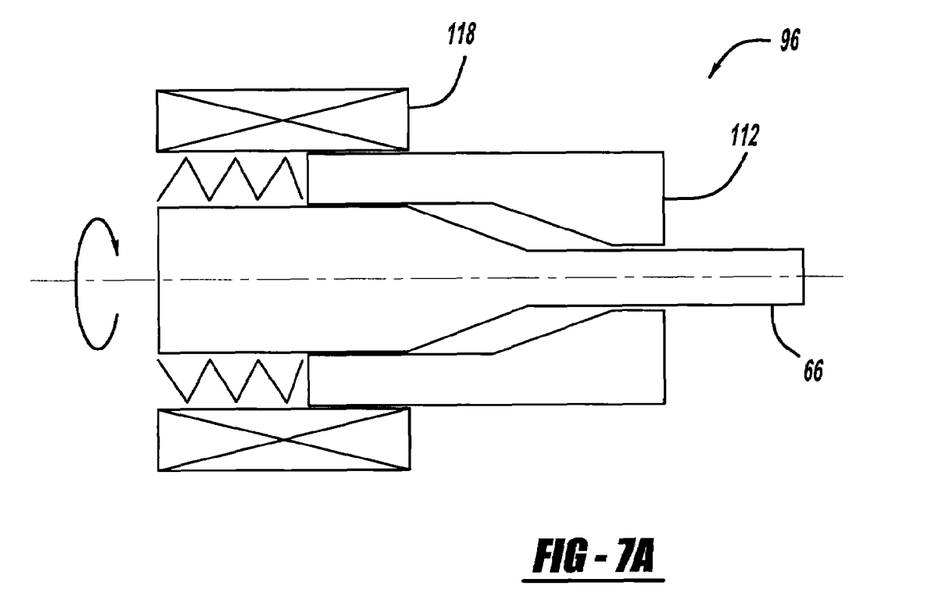
FIG. 7A is a side view of a disengaged solenoid brake.
Figure 7B:
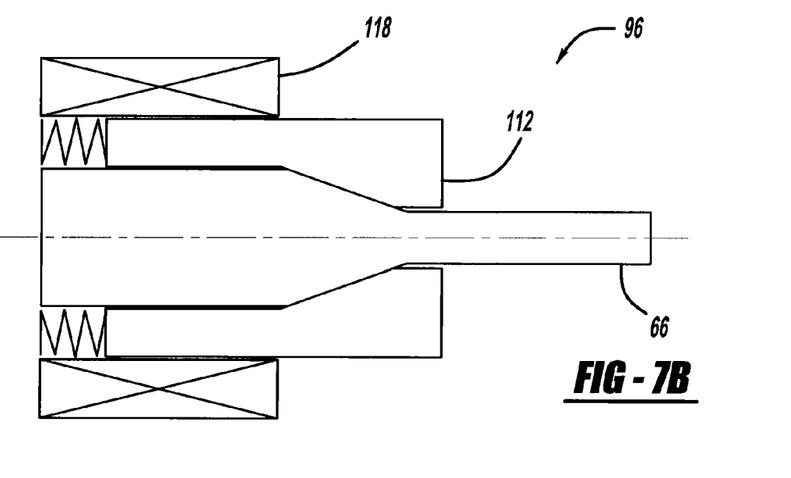
FIG. 7B is a side view of an engaged solenoid brake.

To prevent rotation of the fan 46, a fan brake 96 must be used. FIG. 7A is a side view of a disengaged solenoid brake while FIG. 7B is a side view of an engaged solenoid brake. Although FIGS. 7A and 7B depict an example of a solenoid brake, other braking methods are possible and may be employed. More specifically, with collective reference to FIGS. 4, 7A, and 7B, in which the fan brake 96 is employed to prevent the rotation of the fan 46 to cause heat generation between the driving plate 60 and the driven plate 62, an electromagnetic coil 118 is energized to draw the braking slide 112 into the fan shaft 66. FIG. 7A depicts a situation when the fan 46 is capable of freely spinning while FIG. 7B depicts a situation in which the braking slide 112 is drawn into the fan shaft 66 upon energizing of the electromagnetic coil 118, thereby braking the fan shaft 66 and preventing fan shaft 66 from rotating.

Figure 8:
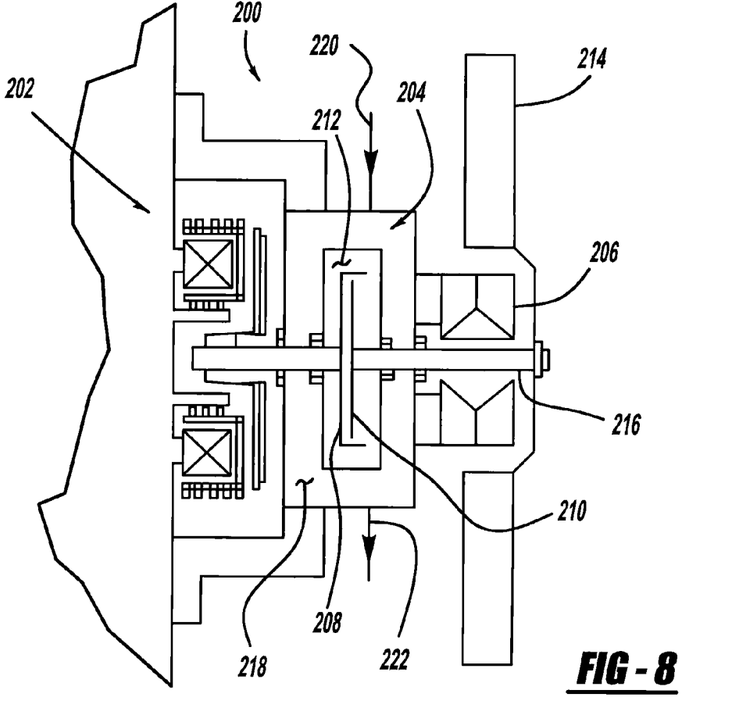
FIG. 8 is an enlarged view of another embodiment of a viscous heater and fan drive depicting an alternate arrangement of an electromagnetic clutch and a viscous heater and fan drive.

FIG. 8 is an enlarged view of another embodiment of a viscous heater and fan drive 200 that depicts an alternate arrangement of an electromagnetic clutch 202 and a viscous drive 204. While the arrangement of the electromagnetic clutch 202 and the viscous drive 204 are different from the prior embodiment, their function is the same. That is, during one operation scenario of the engine 12, neither the electromagnetic clutch 202 nor the fan brake 206 are engaged. When the electromagnetic clutch 202 is not engaged, the driving plate 208 does not rotate and thus the driven plate 210 does not rotate within the viscous drive cavity 212, and thus, no heat is generated. Likewise since the fan 214 is connected to the fan shaft 216, the fan shaft 216 and fan 214 do not rotate. This operation is similar to the operation described above regarding FIG. 3. An advantage of the arrangement of FIG. 8 is that concentric shafts are not needed, which may make assembly easier.

In a second scenario, in supplemental heat generation or boost mode, the electromagnetic clutch 202 is engaged and the fan brake 206 is engaged (not shown in FIG. 8). In such a scenario, heat is generated in the viscous fluid surrounding the driving plate 208 and the stationary driven plate 210 which is then transferred to the liquid cooling fluid within the viscous heater cavity 218. Although not depicted in FIG. 8, the result of the engagements of the plates 208, 210 is similar to the scenario and operation explained regarding FIG. 4 above. Liquid coolant enters the viscous heater cavity 218 through the inlet 220, is warmed in the viscous heater cavity 218, and then passes out of the cavity 218 through the outlet 222.

In a third scenario, the electromagnetic clutch 202 is engaged and the fan brake 206 is disengaged. This scenario, in which viscous coupling of the plates 208, 210 occurs, permits the fan 214 to rotate and provide cooling air through the radiator, but does not generate heat within the viscous heater cavity 218, because viscous coupling occurs in which the driving plate 208 and the driven plate 210 rotate at the same speed. The third scenario is similar in operation to the description of FIG. 5 above.

There are multiple advantages of the above embodiments of the teachings of the present invention. The combination of a viscous heater and fan drive 44 reduces the number of components in a vehicle which saves space within an engine compartment, time during vehicle engine and vehicle assembly, and costs of multiple components. Additionally, combining a viscous heater and a viscous drive results in a single, compact device that accomplishes multiple tasks.

What is claimed is:

1. An apparatus for an engine comprising:
   an electromagnetic clutch mounted to the engine;
   a viscous drive mounted to the electromagnetic clutch;
   an engine cooling fan mounted to a fan shaft, the fan shaft coupled to the viscous drive;
   a viscous drive case defining a viscous fan drive cavity surrounding the viscous drive; and
   a coolant case surrounding the viscous drive case and defining a coolant chamber for a coolant therebetween, the coolant chamber also being a viscous heater cavity, the coolant case further comprising:
   a coolant inlet;
   a coolant outlet, wherein the coolant inlet permits the coolant into the coolant chamber and the coolant outlet permits coolant out of the coolant chamber;
   a heater core, wherein the coolant from the coolant outlet flows into the heater core;
   a drive pulley;
   a drive pulley shaft upon which the drive pulley rotates, wherein the electromagnetic clutch permits coupling of the drive pulley and the drive pulley shaft to drive the viscous drive, wherein the fan shaft and the drive pulley shaft are non-concentric and serially arranged.

2. The apparatus of claim 1, further comprising:
   a fan brake, wherein the fan brake stops rotation of the engine cooling fan.

3. The apparatus of claim 2, wherein the engine cooling fan, viscous fan drive cavity, and viscous heater cavity are mounted symmetrically about the fan shaft.

4. The apparatus of claim 1, further comprising:
   a viscous fluid within the viscous drive case, the coolant facilitating heat transfer from the viscous fluid to the coolant that flows to the heater core;
   a heater core blower; and
   a heater core casing within which the heater core resides, the heater core blower blowing air through the heater core.

5. An apparatus for an engine comprising:
   an electromagnetic clutch mounted to the engine;
   an engine cooling fan;
   a viscous drive coupled to the electromagnetic clutch, the engine cooling fan coupled to the viscous drive, the viscous drive surrounded by a viscous drive case, which defines a viscous chamber;
   a drive pulley that drives the viscous drive;
   a coolant case and coolant chamber that both encapsulate the viscous drive case, the coolant chamber for holding a coolant, the coolant case further comprising:
   a coolant inlet; and
   a coolant outlet, wherein the coolant inlet provides a coolant inlet into the coolant case and the coolant outlet provides a coolant outlet from the coolant case;
   a heater core, the heater core for receiving the coolant from the coolant outlet of the coolant case;
   an engine cooling fan drive shaft that is coupled to the viscous drive and the engine cooling fan;
   a driven plate coupled to the engine cooling fan drive shaft as part of the viscous drive;
   a drive pulley drive shaft that couples to the viscous drive and the drive pulley;
   a driving plate coupled to the drive pulley drive shaft as part of the viscous drive, the electromagnetic clutch to engage and disengage the drive pulley with the drive pulley drive shaft;
   a fan brake to control the engine cooling fan; and
   a controller that engages and disengages the electromagnetic clutch and the fan brake based on a temperature of the coolant, wherein the engine cooling fan drive shaft and the drive pulley shaft are arranged serially and are non-concentric.

6. An apparatus for an engine comprising:
   an electromagnetic clutch mounted to the engine;
   a clutch plate for coupling to the electromagnetic clutch;
   a driving shaft attached to the clutch plate of the electromagnetic clutch;
   a viscous device within a viscous device case defining a viscous chamber for a viscous fluid, the viscous device mounted to the electromagnetic clutch, the viscous device further comprising:
   a driving plate attached to the driving shaft; and
   a driven plate attached to a driven shaft;
   a liquid coolant case defining a liquid coolant chamber for a liquid coolant, the liquid coolant chamber surrounding the viscous device case, the driving shaft and the driven shaft each passing through the viscous device case and the liquid coolant case, the driving shaft and the driven shaft are serially arranged and non-concentric;
   a viscous fluid within the viscous device case, wherein the viscous device generates heat in the viscous fluid and transfers the heat from the viscous fluid into the viscous device case and into the liquid coolant in the liquid chamber;
   a heater core, wherein the heater core receives the liquid coolant from the liquid chamber;
   a fan brake attached to the viscous device, the fan brake for stopping rotation of the driven shaft; and
   a fan attached to the driven shaft, the fan for cooling the engine.

7. The apparatus of claim 6, further comprising:
   a heater core casing, wherein the heater core resides within the heater core casing; and
   a blower, wherein the blower blows air through the heater core and heater core casing.

8. The apparatus of claim 6, further comprising:
   a temperature sensor that senses the liquid coolant temperature; and
   a controller that engages and disengages the electromagnetic clutch based upon the temperature sensed by the temperature sensor.

9. The apparatus of claim 8, wherein the fan brake is engaged and disengaged by the controller based upon the temperature sensed by the temperature sensor.

* * * * *